US012746906B2

(12) United States Patent
Böhm

(10) Patent No.: US 12,746,906 B2
(45) Date of Patent: Sep. 29, 2026

(54) METHOD FOR MONITORING AN ELECTRICALLY OPERATED BRAKE, AND BRAKE ARRANGEMENT

(71) Applicant: Continental Automotive Technologies GmbH, Hannover (DE)

(72) Inventor: Jürgen Böhm, Oberneisen (DE)

(73) Assignee: AUMOVIO Germany GmbH, Frankfurt am Main (DE)

( * ) Notice: Subject to any disclaimer, the term of this patent is extended or adjusted under 35 U.S.C. 154(b) by 246 days.

(21) Appl. No.: 18/718,325

(22) PCT Filed: Dec. 1, 2022

(86) PCT No.: PCT/DE2022/200283
§ 371 (c)(1),
(2) Date: Jun. 10, 2024

(87) PCT Pub. No.: WO2023/104258
PCT Pub. Date: Jun. 15, 2023

(65) Prior Publication Data
US 2025/0050861 A1 Feb. 13, 2025

(30) Foreign Application Priority Data
Dec. 10, 2021 (DE) ..................... 10 2021 214 096.3

(51) Int. Cl.
*B60T 17/22* (2006.01)

(52) U.S. Cl.
CPC ....... *B60T 17/221* (2013.01); *B60T 2270/406* (2013.01)

(58) Field of Classification Search
CPC ... B60T 17/22; B60T 17/221; B60T 2270/406
See application file for complete search history.

(56) References Cited

U.S. PATENT DOCUMENTS

2008/0021624 A1* 1/2008 Maron .................. B60T 13/741 701/70
2010/0308645 A1* 12/2010 Maron .................. B60T 17/221 701/70
2018/0170340 A1 6/2018 Hecker
(Continued)

FOREIGN PATENT DOCUMENTS

CN 113428123 A * 9/2021 .............. B60T 13/68
DE 19742920 A1 * 4/1999 .............. B60T 13/74
(Continued)

OTHER PUBLICATIONS

Notice of Reasons for Refusal mailed on May 28, 2025 for the counterpart Japanese Patent Application No. 2024 532870 and machine translation of same.
(Continued)

*Primary Examiner* — Herbert K Roberts

(57) ABSTRACT

A method for monitoring an electrically actuated brake comprises ascertaining a base friction and a mechanical efficiency of the brake. An expected residual application force is determined based on the base friction and the mechanical efficiency of the brake. If the residual application force is at least as high as a threshold value, an error message is issued. An associated brake arrangement for executing the method is also disclosed.

15 Claims, 3 Drawing Sheets

(56) References Cited

U.S. PATENT DOCUMENTS

| | | | | |
|---|---|---|---|---|
| 2019/0135259 | A1* | 5/2019 | Jo | B60T 7/085 |
| 2019/0217836 | A1* | 7/2019 | Bast | B60T 17/18 |
| 2019/0382037 | A1* | 12/2019 | Call | B61H 13/02 |
| 2021/0070273 | A1* | 3/2021 | Timm | B60T 17/221 |
| 2021/0078557 | A1* | 3/2021 | Kobune | B60T 13/741 |
| 2022/0003288 | A1* | 1/2022 | Putz | B60T 17/22 |
| 2022/0281431 | A1* | 9/2022 | Ritter | F16D 65/14 |
| 2022/0297661 | A1* | 9/2022 | Kircher | B60T 7/045 |
| 2024/0262333 | A1* | 8/2024 | Li | B60T 17/221 |

FOREIGN PATENT DOCUMENTS

| | | | | |
|---|---|---|---|---|
| DE | 10361042 | B3 | 5/2005 | |
| DE | 102004030641 | A1 | 7/2005 | |
| DE | 102006052810 | B4 | 9/2021 | |
| DE | 102021202612 | A1 | 9/2022 | |
| DE | 102021214093 | A1 | 6/2023 | |
| EP | 3868619 | A1 * | 8/2021 | B60T 13/741 |
| JP | 2003522060 | A | 7/2003 | |
| JP | 2018523607 | A | 8/2018 | |

OTHER PUBLICATIONS

Notice of Reasons for Refusal proposed on Sep. 4, 2025 for the counterpart Japanese Patent Application No. 2024-532870 and machine translation of same.

Korean Office Action dated Sep. 22, 2025 for the counterpart Korean Patent Application No. 10 2024 7016277 and machine translation of same.

German Search Report dated Nov. 7, 2022 for the priority German Patent Application No. 10 2021 214 096.3 and machine translation of same.

The International Search Report and the Written Opinion of the International Searching Authority mailed on Feb. 20, 2023 for the PCT Application No. PCT/DE2022/200283 and machine translation of same.

Decision of Refusal mailed on Mar. 18, 2026 for the counterpart Japanese Patent Application No. 2024-532870 and machine translation of same.

Decision of Dismissal of Amendment mailed on Mar. 18, 2026 for the counterpart Japanese Patent Application No. 2024-532870 and machine translation of same.

* cited by examiner

METHOD FOR MONITORING AN ELECTRICALLY OPERATED BRAKE, AND BRAKE ARRANGEMENT

TECHNICAL FIELD

The embodiments relate to a method for monitoring an electrically actuated brake and to an associated brake arrangement.

BACKGROUND

Brakes are typically used in motor vehicles to decelerate them in a targeted manner. Modern brake systems are often actuated hydraulically or pneumatically. However, future brakes will increasingly also involve electrical actuation.

A typical requirement for motor vehicle brakes is that they should be designed to be released in the event of non-actuation, so that a braking action is no longer taken. This also applies, for example, in the event of a power failure where it is no longer possible to actively release the brake. If the brake were not released in this case, the result could be uncontrollable reactions by the motor vehicle.

It is therefore an object to provide a method for monitoring an electrically actuated brake, which method allows an increase in safety, for example with regard to the release behavior of the brake. It is also an object to provide a brake arrangement for executing such a method.

SUMMARY

A method for monitoring an electrically actuated brake comprises: ascertaining a base friction of the brake, ascertaining a mechanical efficiency of the brake, determining an expected residual application force based on the base friction and the mechanical efficiency, and issuing an error message if the residual application force is at least as high as a threshold value.

In the method, an expected residual application force can be calculated, this indicating the residual application force that can be expected in the event of non-actuation, for example due to a power failure. The brake is therefore typically initially in an at least partially applied state, which is also desired in principle. The residual application force that is to be expected when the actuation stops and the brake cannot be actively moved to the released state, for example because electrical energy is no longer available to actuate the brake, is then calculated by means of the method. In the latter case, it should be noted that energy is then no longer available to actively release the brake either. If an expected residual application force which is higher than a threshold value is calculated, the error message can be issued, so that, if necessary, further measures can be initiated to enable safe operation of the vehicle in this operating situation too. For example, the error message may lead to a warning being given to the driver, so that the driver reduces their speed or visits a workshop, for example.

Base friction can be understood to mean, for example, friction which has to be overcome in order to change the actuation situation of the brake. Mechanical efficiency can be understood to mean, for example, a ratio between a force acting on the brake and a force applied by a motor or actuator. The brake may be, for example, a drum brake or a disk brake, but it may also be a different type of brake. For example, the brake may be provided for braking a motor vehicle such as, for example, a passenger car or a truck. The expected residual application force is typically a quantity which is not measured directly, but rather is determined, that is to say is typically calculated, on the basis of other ascertained data. The error message can be used, for example, internally in a brake control device, and/or it can be issued to other components in a motor vehicle.

The ascertaining steps can at times or always be carried out during or after release of the brake following a service brake request. For example, parts of the method can also be carried out during build-up of force. Such a procedure enables continuous monitoring of the brake, so that it is known at all times whether sufficient release is also ensured in the event of a situation in which the brake is to be released.

The threshold value may be set such that a force below the threshold value does not lead to instabilities in the vehicle. This force is therefore a tolerable residual application force. The threshold value may be greater than zero, but it may also be zero, which effectively means that no expected residual application force will be tolerated.

The ascertaining steps can at times or always be carried out in separate test cycles. This also allows ascertaining independently of a braking force request, for example to control the brake while it is not being used for braking.

The determination can be performed, by means of a deterministic function. For example, a function which specifies the expected residual application force from combinations of base friction and mechanical efficiency can therefore be stored. This function may have been determined, for example, for a specific brake or a specific brake type.

The determination can be performed by means of a simulation model according to one embodiment. Such a simulation model can simulate, for example, certain parameters of the brake and output the expected residual application force based on input variables. The determination can also be performed by means of a relationship determined by upstream simulation studies.

The determination of the residual application force can be performed, by simulation of the running time, for example the running time of an electromechanical brake controller. The determination can also be performed with parameters and dependencies ascertained from the simulation.

The determination can be performed by means of an experimentally measured relationship according to one embodiment. Therefore, the relationship can be experimentally determined once for one brake or one brake type and then used for the running time. The relationship may be a previously experimentally measured relationship between residual application force, mechanical efficiency and base friction. Other parameters, for example those described herein, can accordingly also be taken into account.

The residual application force can be determined as the force which remains when the brake is passively released. For example, such passive release can occur if the power fails. In this case, it is no longer possible to actively release the brake. Active release is understood to mean, in particular, active return of a brake shoe or another device, for which purpose the actuator typically acts in an opposite direction compared to a direction required for actuation. In the case of passive release, however, the brake is no longer acted on in a targeted manner; it is only released due to forces that have a mechanical action anyway.

A brake application force can also be measured. The determination can also be performed based on the brake application force. This can improve the determination yet further. The brake application force can be measured, for example, by means of a force sensor.

The threshold value can be adapted depending on a vehicle type and/or depending on a driving situation. Therefore, for example, a somewhat higher residual application force can be tolerated in the case of a large, heavy vehicle than in the case of a small vehicle. In addition, the threshold value can be made dependent on the driving situation, for example on a speed or a loading state, so that higher threshold values can be tolerated in non-critical driving situations if necessary.

According to one embodiment, the determination is only carried out if a brake application force that has been measured or applied as a setpoint value is greater than the threshold value or is greater than a lower additional threshold value. As a result, it is possible to largely dispense with carrying out the method if only a brake application force, which in itself is not critical, is applied anyway. Since no higher brake application force than a critical value is applied during release, a critical value of a brake application force should not be expected during release either. The lower additional threshold value may be lower than the threshold value, so that a certain safety buffer can be provided between the lower additional threshold value and the threshold value.

According to one embodiment, the determination is only carried out if a brake application force that has been measured or applied as a setpoint value is lower than an upper additional threshold value. As a result, it is possible to largely dispense with carrying out the method when the brake application force is so high anyway that relevant release of the brake can be expected due to the forces that have a mechanical action or the vehicle is already very heavily braked, for example so that it comes to a stop, anyway.

For example, computing power can be saved by dispensing with carrying out the method or dispensing with a determination.

A measured brake application force can be measured, for example, by a force sensor. A brake application force applied as a setpoint value can be, in for example, a brake application force which is derived as a braking force request from a sensed position of a brake pedal or is generated by vehicle movement dynamics control or another driving assistance function, which can generate braking force requests. For example, the threshold value can be at most as high as a brake application level of a released brake that can be tolerated in terms of vehicle movement dynamics. This enables an error message to be reliably issued when the expected residual application force is greater than the brake application level that can be tolerated in terms of vehicle movement dynamics. States that are unstable in terms of vehicle movement dynamics can be reliably avoided in this way.

The base friction can be determined, for example, when the brake is in the released state. It is possible here to ascertain the friction that has to be overcome in order to actuate the brake.

The brake may be, for example, a disk brake or a drum brake. This corresponds to typical designs of brakes for passenger cars, trucks or other motor vehicles. However, other designs are also possible.

A base friction can be ascertained, for example in a position-controlled test cycle, within a clearance position of the brake based on an actuator torque determined in the process. For example, the actuator torque can be used as the base friction, or a predefined relationship between the actuator torque and the base friction can be used. In this case, sliding adjustment is also possible, for example as described elsewhere in this document.

The mechanical efficiency can be determined, for example when the brake is actuated, based on a brake application force and a compensated actuator torque. The compensated actuator torque may be, for example, the actuator torque minus an acceleration torque. Such a procedure for determining the mechanical efficiency takes into account an effect of the relevant compensated actuator torque on the brake.

An embodiment also relates to a brake arrangement having an electrically actuated brake and a control device which is configured to execute a method as described herein. With regard to the method, reference can be made to all of the embodiments and variants described herein.

Embodiments also relate to non-volatile computer-readable storage medium on which program code is stored, during the execution of which a processor executes a method as described herein. With regard to the method, reference can be made to all of the embodiments and variants described herein.

BRIEF DESCRIPTION OF THE DRAWINGS

A person skilled in the art will gather further features and advantages from the exemplary embodiment described below with reference to the appended drawing, in which.

DETAILED DESCRIPTION

Figure 1:
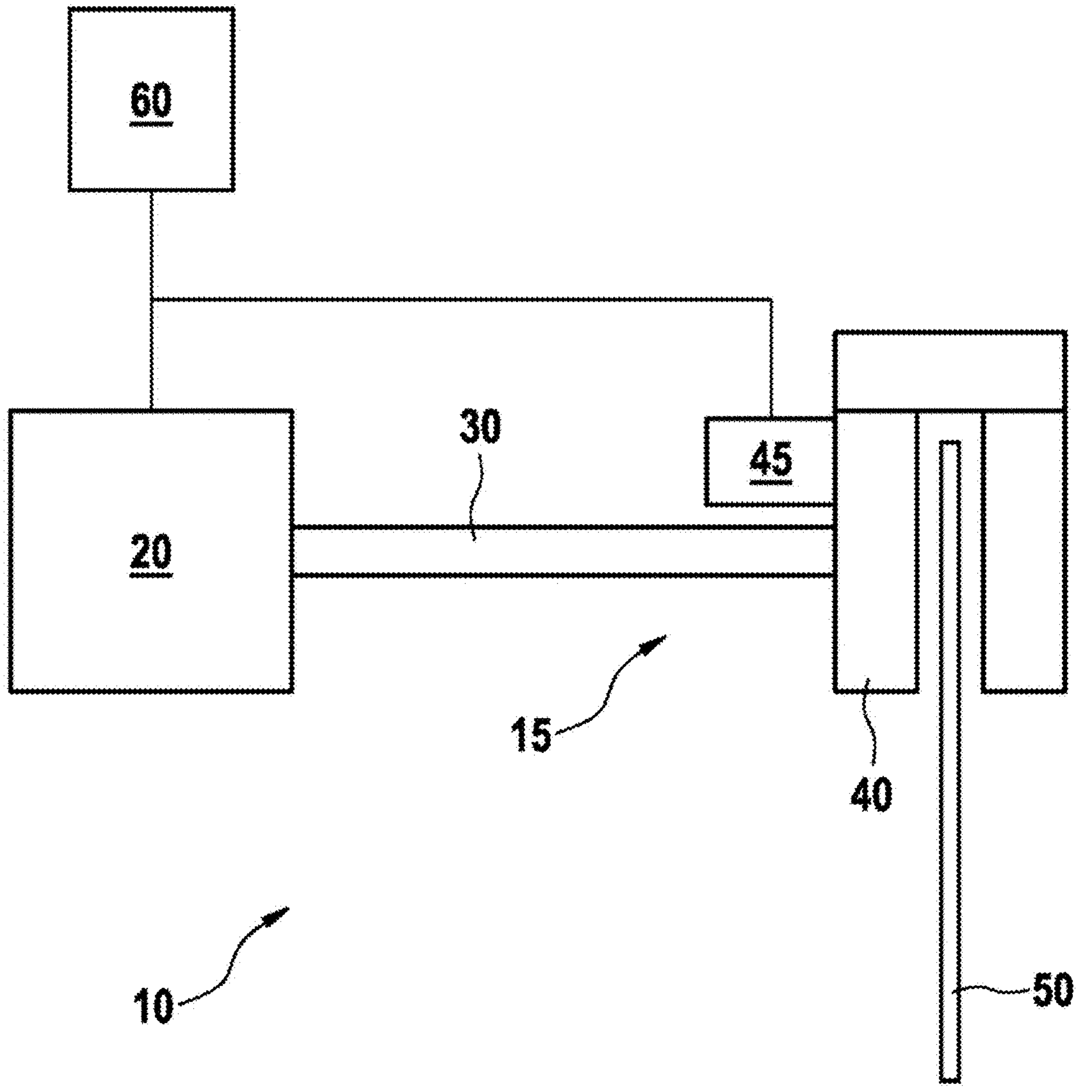
FIG. 1: shows a brake arrangement.

FIG. 1 shows, purely schematically, a brake arrangement 10 according to an exemplary embodiment.

The brake arrangement 10 has an electrically actuated brake 15 and a control device 60.

The electrically actuated brake 15 has an actuator 20 which is designed as an electric motor. The actuator 20 acts on brake shoes 40 via a shaft 30. These brake shoes can act on a brake disk 50 when actuated, so that rotation of the brake disk 50 is braked.

An application force sensor 45 is associated with the brake shoes 40. This application force sensor measures a currently actually applied brake application force.

The control device 60 is connected both to the actuator 20 and to the application force sensor 45. The control device can therefore activate and actuate the actuator 20. The control device can also receive the respective measured value measured by the application force sensor 45. The control device can therefore control the brake application force, for which purpose a setpoint value for the brake application force is typically received from a device not shown, such as a vehicle movement dynamics control function for example. It is also possible in this way to immediately implement a braking force request sensed from a manually actuated brake pedal.

The control device 60 is also configured to execute a method in accordance with at least one exemplary embodiment. This will be discussed in more detail below.

As has been recognized, in an electromechanical brake such as in the brake 15 shown in FIG. 1, an electromechanical drive train, that is to say here typically the actuator 20, the shaft 30 and a possible rotation-translation mechanism not shown, usually has a mechanical efficiency which is <100% and therefore does not ensure passive "self"-release of the brake 15 by design. In addition, the mechanical base friction, which is dependent on the direction of rotation of the actuator 20, has an influence. These two parameters are dependent, amongst other things, on the loading on the components over the running time and the state of lubrication of the mechanism/drive components etc.

Self-release of the electromechanical brake in the passive state can be relevant to safety since, for example in the event of a power failure when a brake is applied, incomplete release of the brake can lead to an unstable vehicle. Here, the electromechanical brake should move from a first brake application level $F_{Sp,A}$, which is set based on the requests, without active assistance by the electric motor within a specified period of time to a lower, as small as possible, brake application level $F_{Sp,B}<F_{Sp,Limit}$ which can however be tolerated at least from a vehicle movement dynamics point of view. These statements accordingly apply in the case of a braking torque actuator, except that, instead of an application force level, a braking torque is taken into consideration here.

For example, it is proposed to carry out the diagnosis of the expected residual application force or the determination of characteristic values for assessing the function of passive self-release of the brake 15 by way of determining the parameters that are crucial for the property of passive self-release. These parameters are typically at least the mechanical efficiency and/or the mechanical base friction, which is dependent on the direction of rotation.

These parameters are determined mainly during normal operation of the electromechanical brake 15. It is advantageous here that no special tests or test excitations are required for this purpose when the brake 15 is in the actuated state, but rather the signals and signal profiles measured during normal actuation can be used.

When determining characteristic values for diagnosing the residual application force, it is possible to also take into consideration the initial level $F_{Sp,A}$ in addition to the parameters mentioned above. If the electromechanical actuator is at an application force level $F_{Sp,A,1}$, passive self-release of the mechanism with a given mechanical efficiency of $\eta=\eta_1$ and a given mechanical base friction $M_{C0+-}=M_{C0.1}$ results in a residual application force $F_{Sp,B,1}$. If this residual application force $F_{Sp,B,1}<F_{Sp,B,Limit}$, it can be considered to be tolerable at least from a vehicle movement dynamics point of view. A deterioration in the mechanical efficiency ($\eta<\eta_1$) or an increase in the mechanical base friction ($M_{C0+-}>M_{C0.1}$) also leads to an increase in the expected residual application force. The applicable relationships can be determined, for example, theoretically or in the form of simulation studies.

In the context of the present application, it is therefore proposed to determine or estimate the possible residual application force at a given brake application force and on the basis of the parameters efficiency n and base friction torque $M_{C0+-}$ ascertained during normal operation of the actuator 20.

Based on the ascertained parameters and the current application state (typically characterized by the brake application force $F_{Sp}$), the established residual application force $F_{Sp,B,Est}$ which results if the electromechanical brake were to fail at this application force level or which results after passive self-release can now be estimated. The relationships $F_{Sp,B,Est}=f(F_{Sp}, M_{C0+-}, \eta)$ required for this purpose are specific to each type of electromechanical brake and can be obtained, for example, by theoretical or simulative considerations. Comparison with a limit value $F_{Sp,B,Limit}$, which is dependent on the vehicle, possibly on the driving situation and/or the location of the wheel brake, now provides a corresponding status about whether the function of self-release is still guaranteed or whether failure of the brake 15 under consideration and the residual application force that is expected to be established will lead to a safety-critical state from a vehicle movement dynamics point of view. If the latter is the case, appropriate measures, such as warning the driver or precautionary deactivation of the affected brake 15, can be taken in good time.

Figure 2:
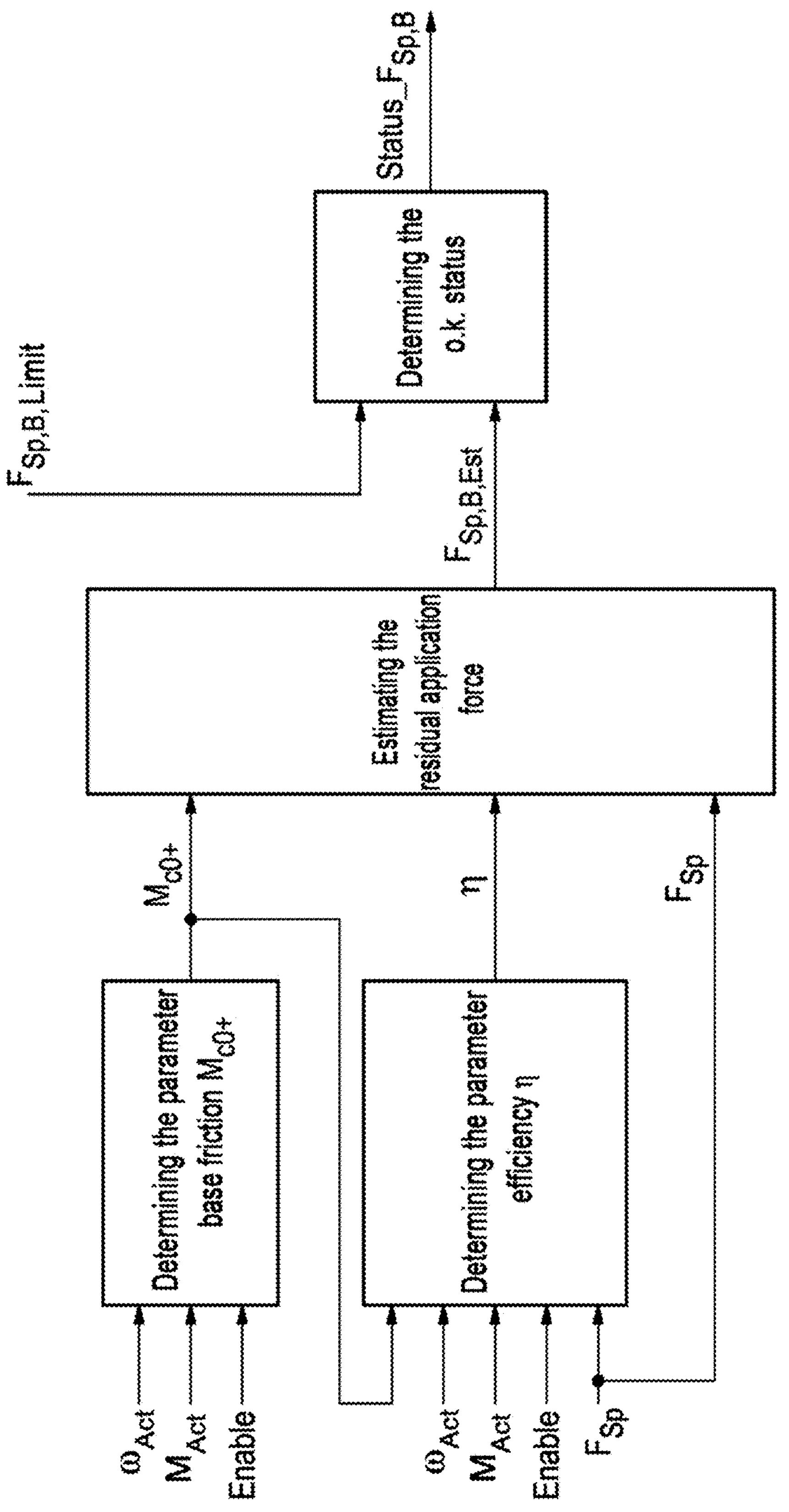
FIG. 2: shows a flowchart.

An exemplary procedure is shown in FIG. 2. Here, the parameter base friction $M_{C0+-}$ is determined based on an angular velocity @Act of the actuator 20, a torque $M_{Act}$ of the actuator 20 and an activation signal "Enable". Furthermore, the parameter efficiency n is determined based on the same input variables and additionally based on the brake application force $F_{Sp}$. The base friction $M_{C0+-}$, the efficiency $\eta$ and the brake application force $F_{Sp}$ are then used to estimate the residual application force $F_{Sp,B,Est}$. This is then compared with a threshold value $F_{Sp,B}$, Limit, from which a status of the residual application force is determined, this status being designated Status_$F_{Sp,B}$. If this is positive, that is to say if the expected residual application force $F_{Sp,B,Est}$ is lower than the threshold value $F_{Sp,B,Limit}$, then nothing further is done. In the opposite case, however, an error message is generated in order to be able to respond to the recognized, potentially critical state.

An alternative embodiment to FIG. 2 provides that the calculations provided in the block "Estimating the residual application force" are carried out only when the currently set application force is above the limit force or the threshold value, that is to say $F_{Sp}>F_{Sp,B,\ Limit}$, and/or is below a second, high limit force, that is to say $F_{Sp}<F_{Sp,c}$ For example, the value for $F_{Sp,C}$ can be selected such that, for application forces that are greater than this value, deformation energy of the (deformed) caliper and the pads stored by the application force $F_{Sp}$ is always sufficient for passive self-release of the electromechanical brake.

The described monitoring functions can be used to check whether the safety-critical function of self-release of the brake 15 is still ensured in the passive state too.

In this case, it is possible to dispense with carrying out special test excitations when the brake 15 is in the applied state and to dispense with observation of the signal profile during a test excitation. Rather, the monitoring function uses knowledge about the parameters (efficiency n and base friction torque $M_{C0+-}$) which are determined from the actuator signals and essentially characterize the state of wear of the actuator. Since the determination can be performed during and after each braking operation, the estimates regarding the function of passive self-release are much more up-to-date than in the case of the method in which special test excitations are carried out when the brake is in the applied state.

The determination of the friction parameter base friction $M_{C0+-}$ or the base friction values $M_{C0+}$ and, respectively, $M_{C0-}$ is described below. The designation $M_{C0+-}$ can be understood here as a placeholder for $M_{C0+}$ and, respectively, $M_{C0-}$ if both the directions of rotation are possible.

The designation is used in such a way that $M_{C0+}$ represents the component which is present for a positive direction of rotation and $M_{C0-}$ specifies the constant component for a negative direction of rotation. A positive direction of rotation corresponds to brake application; a negative direction of rotation corresponds to releasing.

If there is no request for the electromechanical brake 15 to set a defined force generating a braking effect or if an existing force request is reset again (setpoint value=0), the actuator 20 is moved to an unactuated state or held there. This state is determined by an actuator position in which a defined distance between the brake pad and the brake disk (clearance, clearance position $X_{LS}$) is set and maintained by the actuator so that no residual braking torque is produced. As long as the EMB carries out a movement within the clearance, once the motor acceleration dω/dt has ended, the specified motor torque corresponds to an approximately constant friction torque, in particular at low speeds. The motor torque increases in accordance with the load torque $M_{Sp,Load}$ caused by the brake application force $F_{Sp}$ only with the transition to the non-positive movement.

It is therefore proposed according to one possible implementation that, after the brake 15 is released, a position-controlled test cycle is carried out within the clearance position at a low, for example constant, speed and the value for the static friction ($M_{C0+}$, $M_{C0-}$) is determined by evaluating the motor torque for the purpose of determining the base friction parameters $M_{C0+}$ and $M_{C0-}$. This test cycle can be carried out after each release process, only if necessary or at the latest after a time T has elapsed. If there is another force request during the test cycle, the cycle is aborted and the requested force is set.

Figure 3:
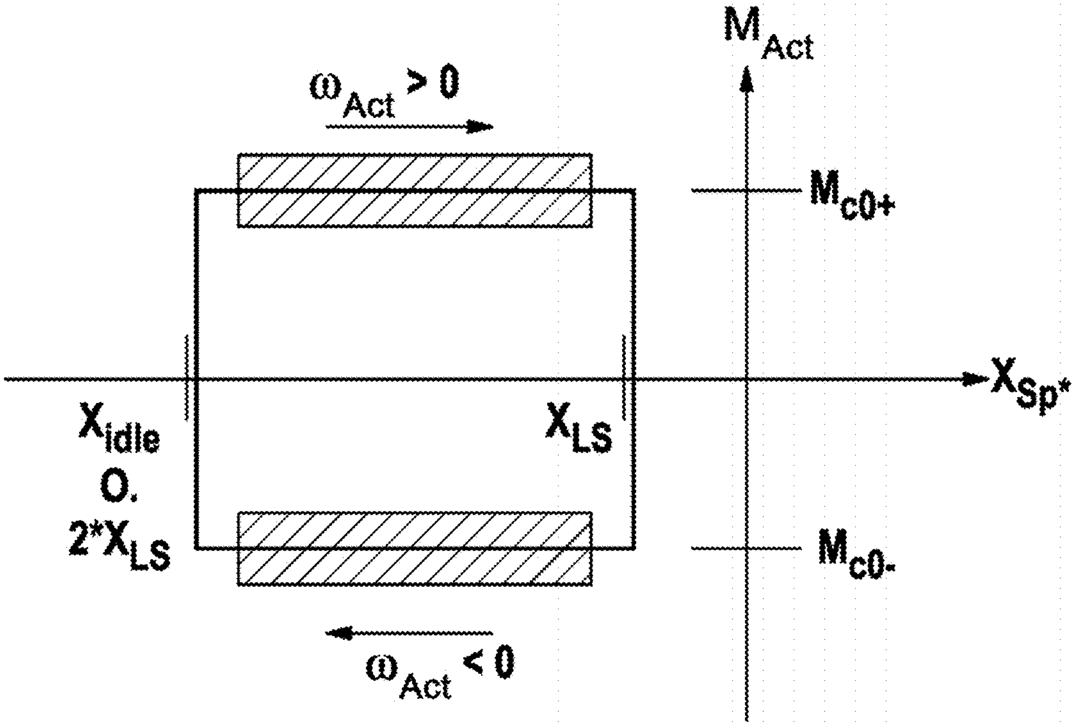
FIG. 3: shows an illustration for ascertaining a base friction.

In order to carry out the test movement, a position-controlled movement with a low negative motor speed is carried out from the set clearance position $X_{LS}$. The values for the motor torque recorded in the process are determined by the base friction $M_{C0-}$. The mean value of the motor torques recorded at $\omega_{Act}<0$ therefore gives an estimate of the parameter base friction in the negative direction of movement. If the target value of e.g. $X_{Target}=-2*X_{LS}$ is reached during the position-controlled movement to the rear, then a position-controlled movement with a low motor speed ($\omega_{Act}>0$) back to the starting point (clearance position $X_{LS}$) is performed. The desired parameter for base friction $M_{C0+}$ is then given by the mean value of the motor torques $M_{Act}$ ($\omega_{Act}>0$) determined during this partial movement. In one embodiment, this determination can also be performed only within a predefined band, which is defined by a specific distance from the start and end positions of the test movement. This is shown in more detail in FIG. 3. Here, the band along the actuator position $X_{Sp}$ is represented in both directions by narrow horizontal rectangles, specifically both with a positive actuator torque (with a positive angular velocity) and with a negative actuator torque (with a negative angular velocity).

It may be provided that the value determined in this way for $M_{C0+}$ and $M_{C0-}$ is not immediately adopted at 100%, but rather is adjusted by a weighting factor. The value can therefore be multiplied by a weighting factor each time it is recalculated and the previous value, multiplied by one minus the weighting factor, can be added to this.

The determination of the friction parameter efficiency μ or η is described below.

In order to determine the efficiency, the starting point used is a simplified model for the actuator dynamics of the electromechanical brake in the form of a differential equation:

$$M_{Act}=J_{Ges}*d(\omega_{Act})/dt+i^{(-1)}*F_{Sp}(X_{Sp})*(1+\mu*\mathrm{sign}(\omega_{Act}))+M_{C0+-}*\mathrm{sign}\ \omega_{Act})$$

If only the case of the positive direction of movement ($\omega_{Act}>0\rightarrow F_{Gradient}>0$) is considered to be a further simplification, a simplified equation is obtained for this case:

$$M_{Act}-J_{Ges}*d(\omega_{Act})/dt=i^{(-1)}*F_{Sp}*(1+\mu)+M_{C0+}$$

If a torque compensated for by the influence of the acceleration torque $$M_{Act,Comp}=M_{Act}-J_{Ges}*d(\omega_{Act})/dt$$

is defined, the following holds for a positive direction of movement ($\omega_{Act}>0\rightarrow F_{Gradient}>0$):

$$M_{Act,Comp}=i^{(-1)}*F_{Sp}*(1+\mu)+M_{C0+}$$

In order to determine the parameter u, which represents the influence of the mechanical efficiency, it is proposed that the signals brake application force $F_{Sp}$ and motor torque or compensated motor torque $M_{Act,Comp}$ are recorded during the force build-up movement of the actuator 20.

Defined force sample points can be defined.

During a force build-up phase, if a force sample point value $F_{Sp,i}$ being exceeded for the first time is reliably identified, the compensated motor torque $M_{Act,Comp,Measure,i}$ associated with this force value can be stored.

If the specified minimum force and a sufficient number of sample points have been recorded, the current parameter μ can be determined e.g. by minimizing a quadratic quality criterion:

$$\Sigma(M_{Act,comp,i}-(i^{(-1)}*F_{Sp,i}*(1+\mu)+M_{C0+}))^2\rightarrow\min$$

Since the value for the base friction $M_{C0+}$ was known or determined beforehand (see FIG. 3), the determination equation:

$$\mu_{Est}=(\Sigma M_{Act,comp,i}-\Sigma M_{C0+}-\Sigma i^{(-1)}*F_{Sp,i})/(\Sigma i^{(-1)}*F_{Sp,i})$$

is obtained for the sought parameter. Here, too, in order to increase the robustness, the parameter thus determined is adjusted by a weighting factor $ß_1$:

$$\mu_{Mod,New}=ß1*\mu_{Est}+(1-ß_1)*\mu_{Mod,Old}$$

Then, the following is obtained for the mechanical efficiency:

$$\eta_{Est,New}=(1+\mu_{Est,New})^{-1}$$

The friction parameters ($M_{C0+-}$ and η or μ) ascertained in the context of the present application for determining a dynamic reserve in the force build-up direction are parameters of the electromechanical brake that represent the state (in particular the state of wear) of the mechanism.

The steps of the method can be executed in the specified order. However, they can also be executed in a different order, if technically feasible. The method can be executed in one of its embodiments, for example with a specific set of steps, in such a way that no further steps are executed. However, further steps can also be executed in principle, even those that are not mentioned.

It is pointed out that features may be described in combination in the claims and in the description, for example in order to facilitate understanding, even though these can also be used separately from one another. A person skilled in the art will recognize that such features may also, independently of one another, be combined with other features or combinations of features.

Dependency references in dependent claims may characterize preferred combinations of the respective features but do not exclude other combinations of features.

The invention claimed is:

1. A method for monitoring an electrically actuated brake comprising:

ascertaining a base friction of the brake;

ascertaining a mechanical efficiency of the brake;

determining an expected residual application force based on the base friction and the mechanical efficiency; and issuing an error message when the residual application force is at least as high as a threshold value.

2. The method as claimed in claim 1, wherein the ascertaining the base friction and the ascertaining the mechanical efficiency are carried out at least sometimes during or after release of the brake following a service brake request.

3. The method as claimed in claim 1, wherein the ascertaining the base friction and the ascertaining the mechanical efficiency at least sometimes carried out in separate test cycles.

4. The method as claimed in claim 1, wherein the determination is performed by means of a deterministic function.

5. The method as claimed in claim 1, wherein the determining the expected residual application force is performed by a simulation model.

6. The method as claimed in claim 1, wherein the determining the expected residual application force is performed by an experimentally measured relationship.

7. The method as claimed in claim 1, wherein the residual application force is the force which remains when the brake is passively released.

8. The method as claimed in claim 1, further comprising measuring a brake application force, and wherein the determining the expected residual application force is performed based on the brake application force too.

9. The method as claimed in claim 1, further comprising adapting the threshold value is adapted depending on at least one of a vehicle type and a driving situation.

10. The method as claimed in claim 1, wherein the determination is only carried out when the brake application force that has been measured or applied as a setpoint value is greater than the threshold value or is greater than a lower additional threshold value.

11. The method as claimed in claim 1, wherein the determination is only carried out when the brake application force that has been measured or applied as a setpoint value is lower than an upper additional threshold value.

12. The method as claimed in claim 1, wherein the threshold value is at most as high as a brake application level of a released brake that can be tolerated in terms of vehicle movement dynamics.

13. The method as claimed in claim 1, wherein the base friction is determined when the brake is in the released state.

14. The method as claimed in claim 1, wherein the brake is one of a disk brake and a drum brake.

15. A brake arrangement, comprising an electrically actuated brake, and a control device, which is configured to execute instructions for:

ascertaining a base friction of the brake;

ascertaining a mechanical efficiency of the brake;

determining an expected residual application force based on the base friction and the mechanical efficiency; and issuing an error message when the residual application force is at least as high as a threshold value.

* * * * *